United States Patent
Mitrovic et al.

(10) Patent No.: US 11,580,685 B2
(45) Date of Patent: Feb. 14, 2023

(54) PHYSICS ENGINE WITH COLLISION DETECTION NEIGHBOR WELDING

(71) Applicant: Microsoft Technology Licensing, LLC, Redmond, WA (US)

(72) Inventors: Petar Mitrovic, Arandjelovac (RS); Maxwell Simon Abernethy, Munich (DE); Alexander Sven Fichtner, Munich (DE); David Davidovic, Negotin (RS); Eoin McLoughlin, Dublin (IE); Janos Benk, Munich (DE); Michael Alexander Buschbeck, Haimhausen (DE); Milan Simic, Belgrade (RS); Milos Jovanovic, Belgrade (RS); Nikola Nikolic, Belgrade (RS); Norbert Nemec, Munich (DE); Oliver M Strunk, Munich (DE); Pavle Josipovic, Belgrade (RS); Pavle Popovic, Belgrade (RS); Rory Mullane, Dublin (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/199,686

(22) Filed: Mar. 12, 2021

(65) Prior Publication Data
US 2022/0180589 A1    Jun. 9, 2022

Related U.S. Application Data

(60) Provisional application No. 63/122,844, filed on Dec. 8, 2020.

(51) Int. Cl.
*G06T 15/00* (2011.01)

(52) U.S. Cl.
CPC ........ *G06T 15/005* (2013.01); *G06T 2210/21* (2013.01)

(58) Field of Classification Search
None
See application file for complete search history.

(56) References Cited

U.S. PATENT DOCUMENTS

| 10,650,586 B2* | 5/2020 | Chui | G06T 17/20 |
| 2006/0149516 A1* | 7/2006 | Bond | G06F 30/15 |
| | | | 703/6 |

(Continued)

OTHER PUBLICATIONS

Cundall, P.A., "Formulation of a Three-dimensional Distinct Element Model-Part I. A Scheme to Detect and Represent Contacts in a System Composed of Many Polyhedral Blocks", In International Journal of Rock Mechanics and Mining Sciences & Geomechanics Abstracts, vol. 25, Issue 3, Jun. 1988, pp. 107-116.

(Continued)

*Primary Examiner* — Andrew G Yang
(74) *Attorney, Agent, or Firm* — Alleman Hall Creasman & Tuttle LLP

(57) ABSTRACT

A computing device is provided, comprising a processor configured to execute a physics engine. The physics engine is configured to, during narrowphase collision detection of a collision detection phase, identify a set of convex polyhedron pairs, each including a first convex polyhedron from a first rigid body and a second convex polyhedron from a second rigid body. The physics engine is further configured to, for each convex polyhedron pair, determine a separating plane. The physics engine is further configured to perform neighbor welding on pair combinations of the convex polyhedron pairs during the narrowphase collision detection to thereby modify the separating planes of at least a subset of the convex polyhedron pairs. The physics engine is further configured to determine collision manifolds for the convex polyhedron pairs, including for the subset of convex polyhedron pairs having the modified separating planes.

20 Claims, 13 Drawing Sheets

(56) References Cited

U.S. PATENT DOCUMENTS

2014/0244222 A1* 8/2014 Tonge .................... G06F 30/20
  703/2
2019/0065642 A1   2/2019 Simic et al.
2019/0130577 A1* 5/2019 Watanabe .......... H04N 1/32358
2020/0286288 A1* 9/2020 Deng ..................... G06T 19/20

OTHER PUBLICATIONS

Guibas, et al., "Kinetic Collision Detection: Algorithms and Experiments", In Proceedings of the IEEE International Conference on Robotics and Automation, May 21, 2001, pp. 2903-2910.

"International Search Report and Written Opinion Issued in PCT Application No. PCT/US21/056983", dated Feb. 16, 2022, 14 Pages.

"Havok Physics", Retrieved from: https://web.archive.org/web/20200807204255/https//www.havok.com/havok-physics/, Aug. 7, 2020, 40 Pages.

"Physics for Game Programmers; Continuous Collision", Retrieved from: https://www.youtube.com/watch?v=7_nKOET6zwl, Jul. 20, 2018, 5 Pages.

"Continuous collision detection (CCD)", Retrieved from: https://docs.unity3d.com/Manual/ContinuousCollisionDetection.html, Jan. 19, 2021, 8 Pages.

Serrano, Harold, "How does a Physics Engine work? An Overview", Retrieved from: https://www.haroldserrano.com/blog/how-a-physics-engine-works-an-overview, Apr. 24, 2016, 10 Pages.

Souto, Nilson, "Video Game Physics Tutorial—Part I: An Introduction to Rigid Body Dynamics", Retrieved from: https://www.toptal.com/game/video-game-physics-part-i-an-introduction-to-rigid-body-dynamics, Retrieved Date: Oct. 22, 2020, 2 Pages.

* cited by examiner

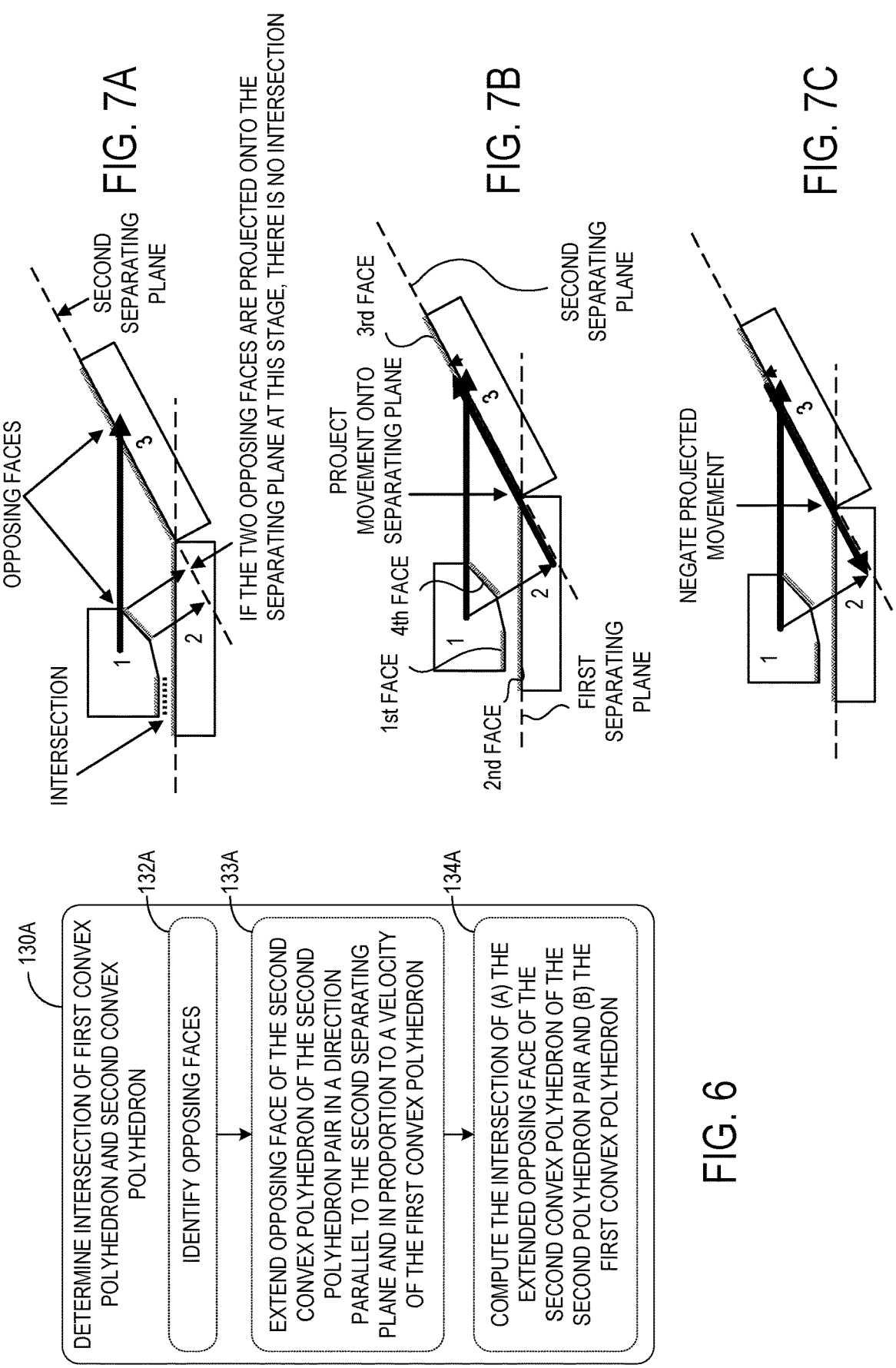

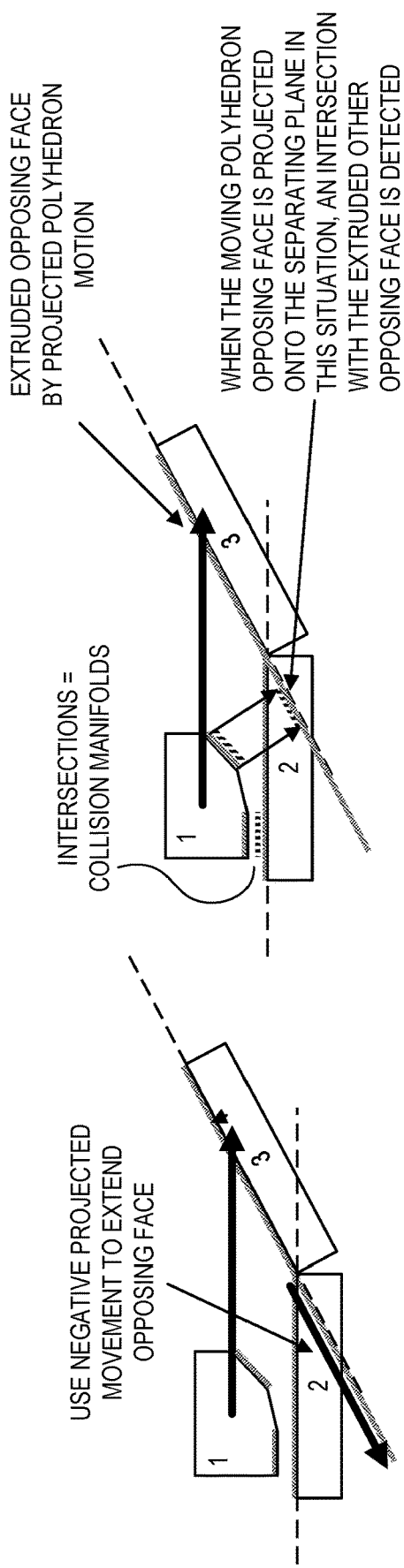
FIG. 7D
FIG. 7E
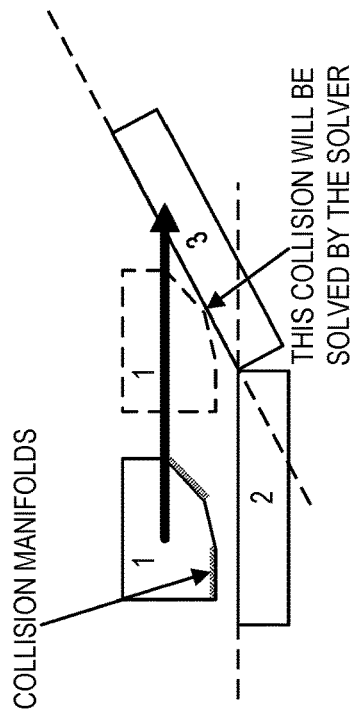
FIG. 7F

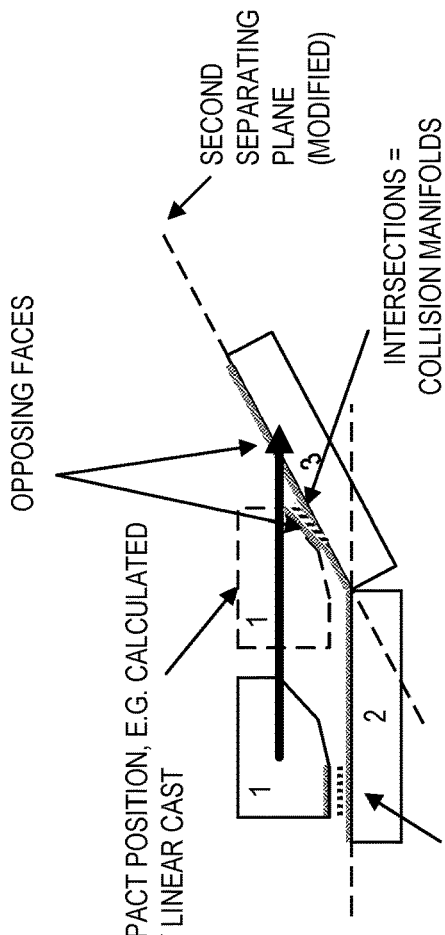
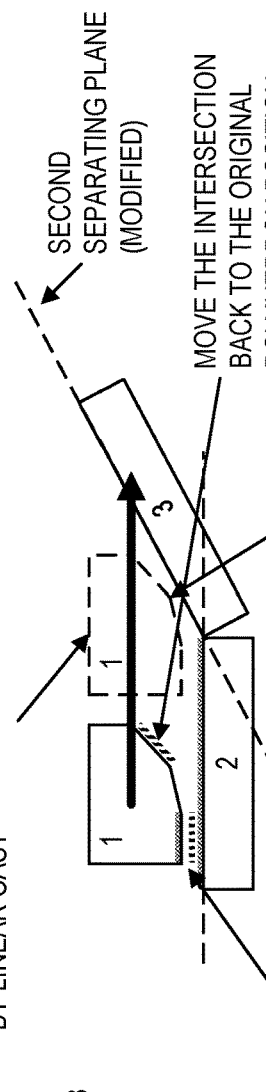
FIG. 9A
FIG. 9B
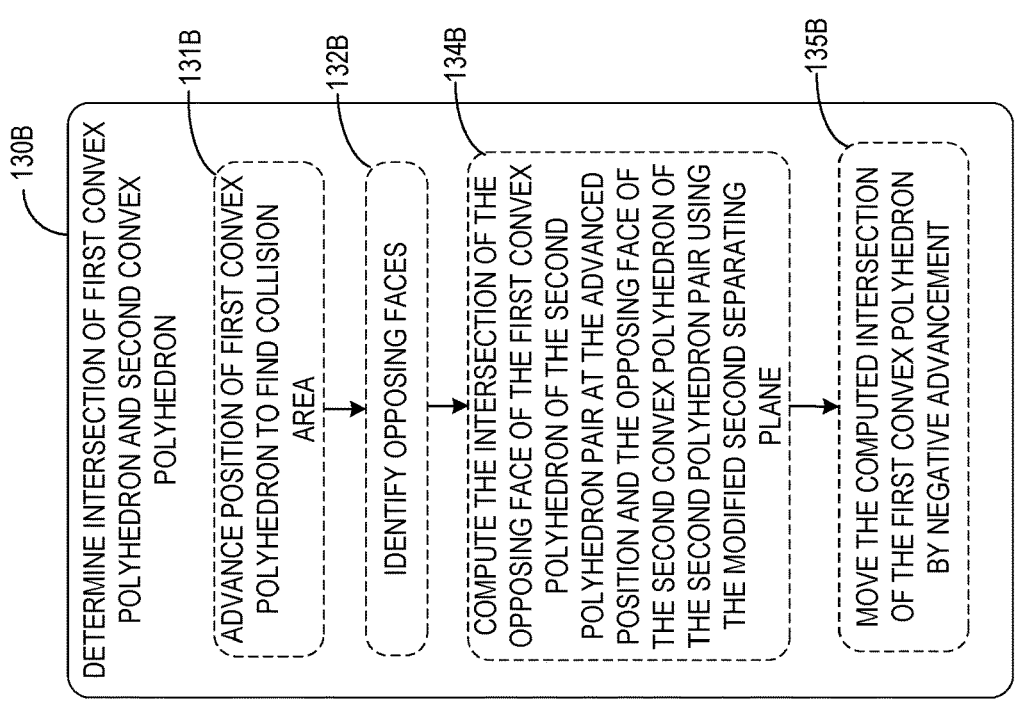
FIG. 8

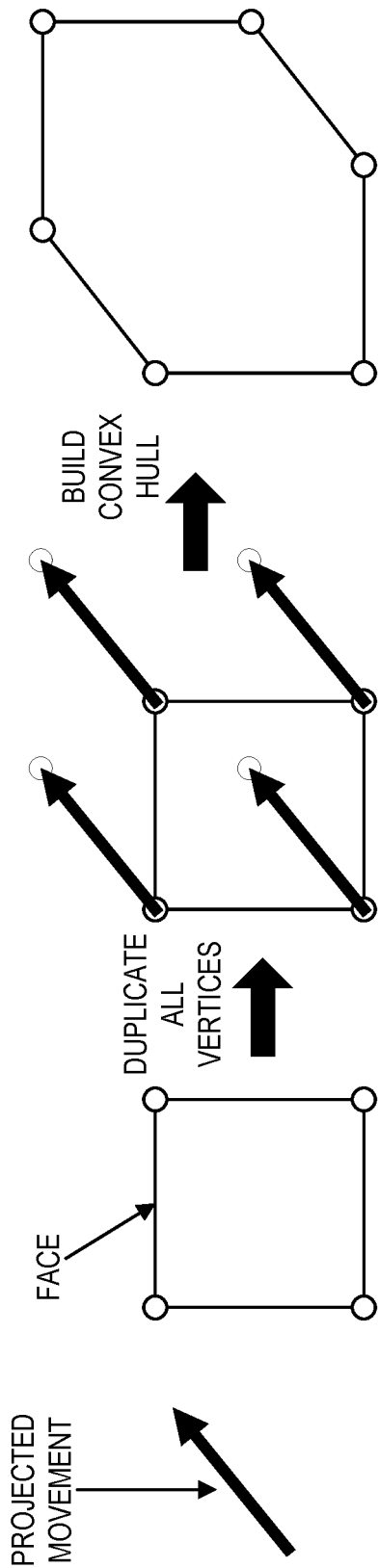

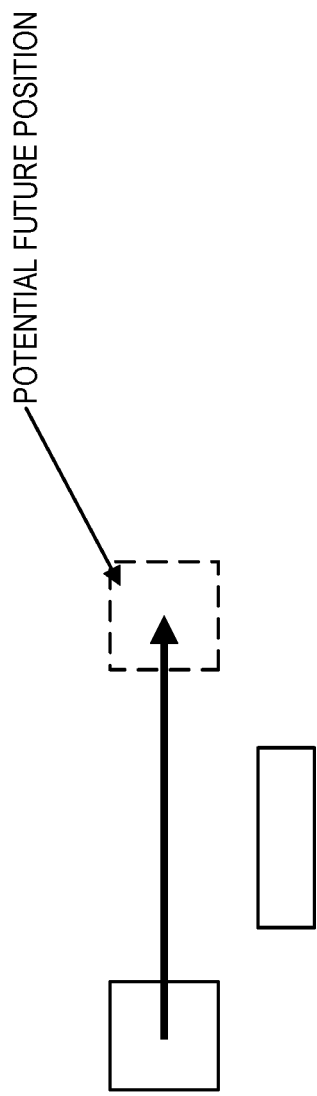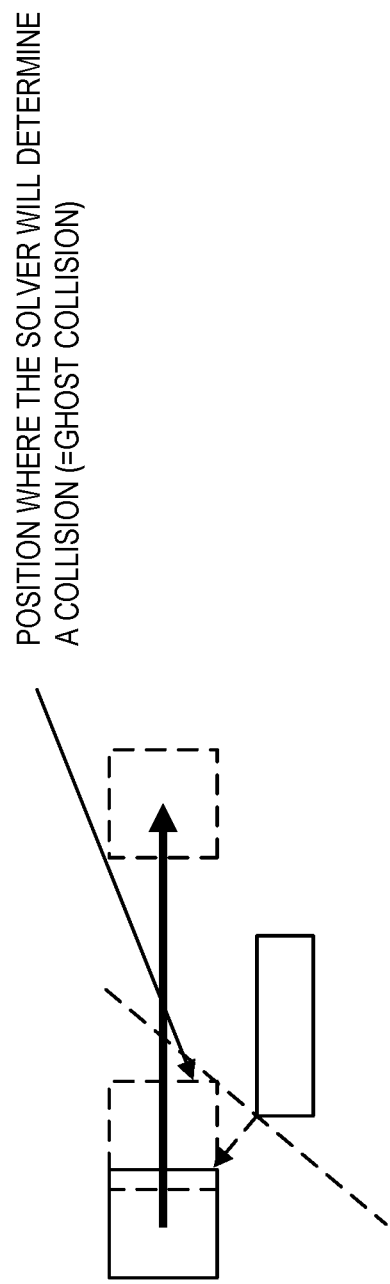
FIG. 13A
FIG. 13B

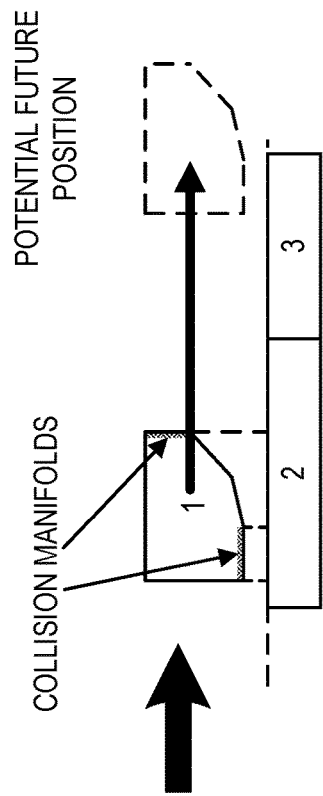
FIG. 16
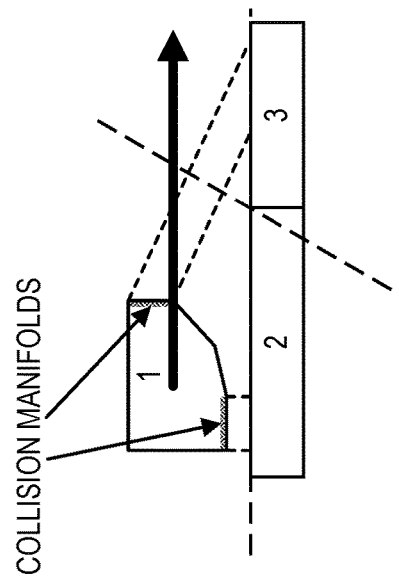
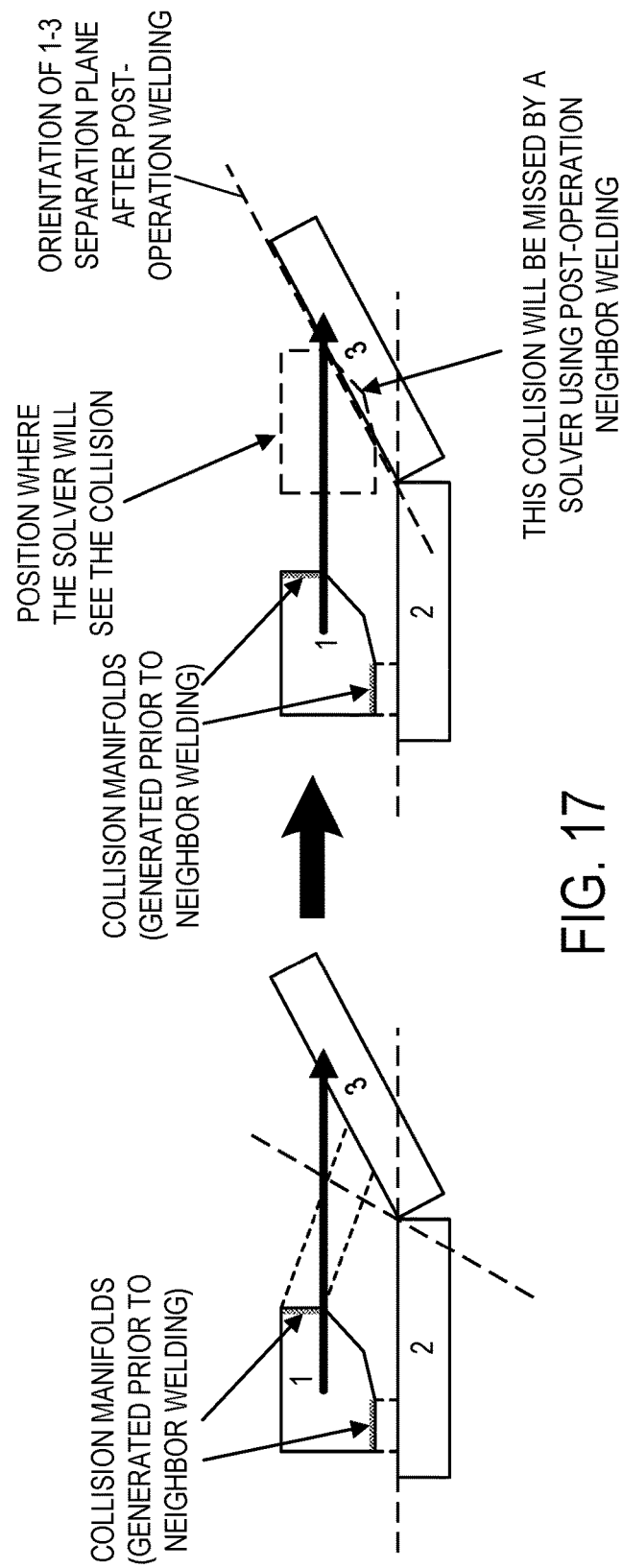
FIG. 17

PHYSICS ENGINE WITH COLLISION DETECTION NEIGHBOR WELDING

CROSS REFERENCE TO RELATED APPLICATIONS

This application claims priority to U.S. Provisional Patent Application Ser. No. 63/122,844, filed Dec. 8, 2020, the entirety of which is hereby incorporated herein by reference for all purposes.

BACKGROUND

Many computer applications such as video games utilize physics engines to simulate real-time movement of rigid objects within a simulated physical environment. A common function of these physics engines is to determine if the rigid objects, each made out of one or more convex polyhedrons, collide within the next simulation step. Upon determining that rigid objects have collided, the physics engine may alter the movement of at least one of the rigid objects, thereby providing a realistic simulation. In order to determine that a collision will occur, the physics engine may predict whether an area on a moving object comes into contact with a plane defined by a face, edge, or vertex of a static object, for example. However, this technique presents several challenges. For example, the physics engine may incorrectly assign an area on the moving object or incorrectly select a plane defined by the face, edge, or vertex of the static object. In these cases, collisions may be predicted when none should occur (so-called ghost collisions) or, real collisions may go undetected resulting in unrealistic and/or inconsistent simulation outcomes and an undesirable user experience.

SUMMARY

To address these issues, a computing device is provided, comprising a processor configured to execute a physics engine. The physics engine is configured to, during narrowphase collision detection of a collision detection phase, identify a set of convex polyhedron pairs, each including a first convex polyhedron from a first rigid body and a second convex polyhedron from a second rigid body. The physics engine is further configured to, for each convex polyhedron pair, determine a separating plane. The physics engine is further configured to perform neighbor welding on pair combinations of the convex polyhedron pairs during the narrowphase collision detection to thereby modify the separating planes of at least a subset of the convex polyhedron pairs. The physics engine is further configured to determine collision manifolds for the convex polyhedron pairs, including for the subset of convex polyhedron pairs having the modified separating planes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a process flow for intersection detection performed in the narrowphase collision detection of FIG. 3.

FIGS. 7A-7F illustrate the process flow of FIG. 6 applied to example rigid bodies by the physics engine of FIG. 1.

FIG. 8 shows another process flow for intersection detection performed in the narrowphase collision detection of FIG. 3.

FIGS. 9A and 9B illustrate the process flow of FIG. 6 applied to the example rigid bodies by the physics engine of FIG. 1.

FIG. 10 illustrates extending a face of a three-dimensional polyhedron.

FIGS. 13A and 13B illustrate a second example of a ghost collision.

FIG. 16 illustrates a fourth example of a ghost collision.

FIG. 17 illustrates an example of a missed collision due to post-operation neighbor welding.

DETAILED DESCRIPTION

Figure 11:
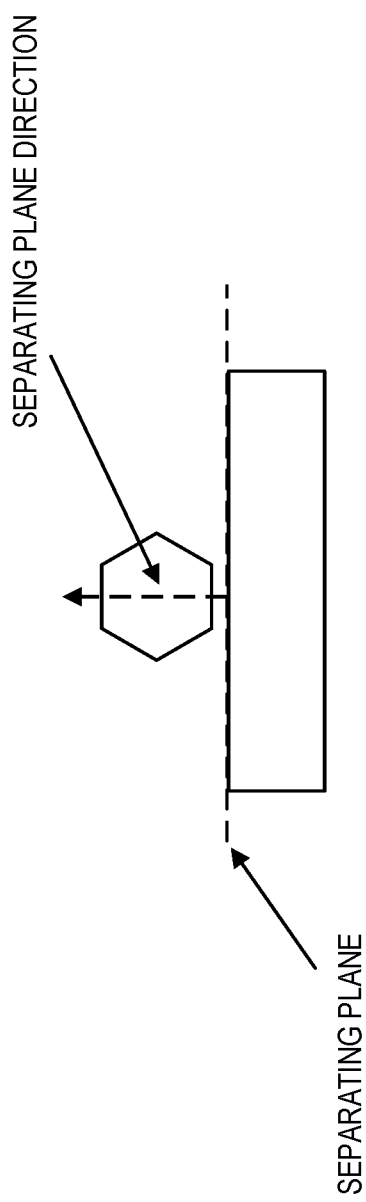
FIG. 11 illustrates a pair of convex polyhedrons, each of the pair belonging to separate rigid bodies.

FIGS. 11-17 are provided to illustrate the issue of ghost collisions in physics engines, and drawbacks that have been discovered with potential approaches to address ghost collisions. FIG. 11 illustrates a pair of convex polyhedrons, each of the pair belonging to separate rigid bodies. The convex polyhedrons are separated by a separating plane having a separating direction. In this example, the separating direction is shown as a vector along a shortest path between a first body having a hexagonal shape and a second body having a rectangular shape. The vector terminates on a first face of the first body and originates on a second face of the second body. The separating plane is defined as a plane perpendicular to the separating direction and including an initial point of the vector. In this example, the separating plane is in contact with the second body, however in another example, the separating plane may be in contact with the first body. In FIG. 11, the separating plane is parallel to and coplanar with a face of the second body because the initial point of the vector lies on the face of the second body.

Figure 12:
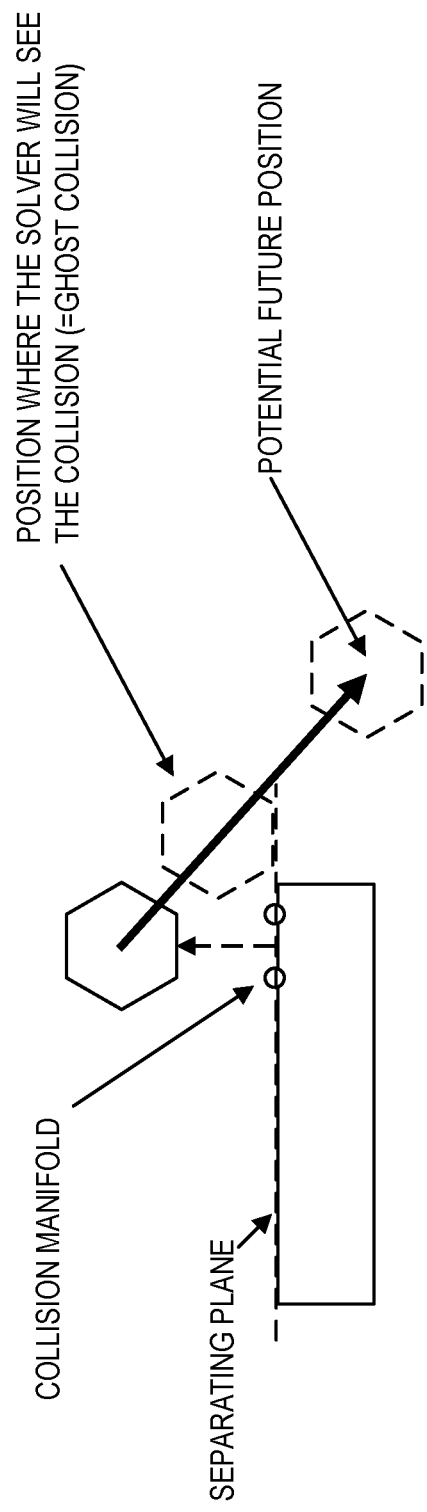
FIG. 12 illustrates a first example of a ghost collision.

Turning now to FIG. 12, an example of a ghost collision is provided. Similarly to FIG. 11, the separating plane is parallel to the second face of the second body. In this example however, the first body is located at a first position and has a movement direction indicated by a velocity vector, while the second body is static. Given the velocity vector, the first body has a potential future position at a subsequent point in time. However, because the separating plane extends indefinitely in all directions, at an intermediate point in time the physics engine may detect a collision where no collision should occur, which is referred to as a "ghost collision."

FIGS. 13A and 13B illustrate another example scenario in which a ghost collision may be detected by a physics engine. Similarly to the previous example, the first body is located at a first position and has a movement direction indicated by a velocity vector, while the second body is static. Given the velocity vector, the first body has a potential future position at a subsequent point in time. Also, as in the previous example, the separating plane extends indefinitely in all directions, and during this timestep the physics engine may detect a ghost collision at the intersection of the body and the separating plane, where no collision should occur. This example differs from the previous example in that the separating plane is non-parallel with the faces of the second body.

Figure 14:
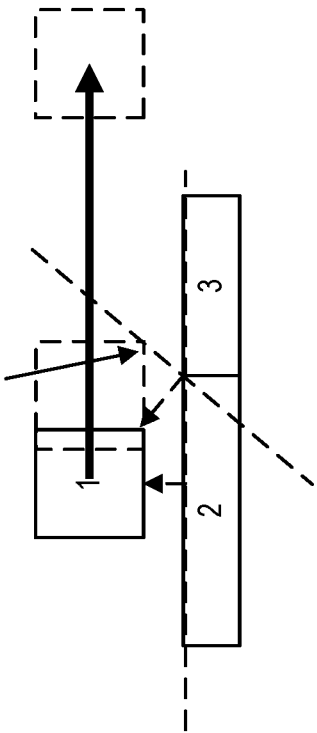
FIG. 14 illustrates a third example of a ghost collision.

FIG. 14 illustrates an example in which a ghost collision may be detected in a simulation having three bodies. In this example, the first body is located at a first position and has a movement direction indicated by a velocity vector, while the second body and third bodies are static. Here, a first separating plane is determined that is between the first body and the second body, and a second separating plane is determined that is between the first body and the third body. Given the velocity vector in this example, no ghost collisions will be detected between the first and second bodies. However, a ghost collision may be detected between the first and third bodies, at the indicated position.

Figure 15:
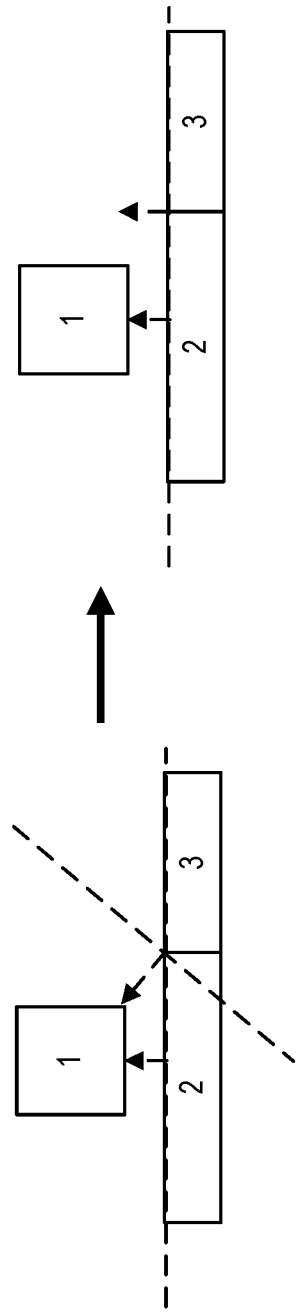
FIG. 15 illustrates an example of post-operation neighbor welding performed on generated collision manifolds after collision detection and after intersection determination, to avoid the ghost collision of FIG. 14.

Turning now to FIG. 15, one approach to avoiding ghost collisions is illustrated, referred to herein as post-operation neighbor welding. The basic principle of post-operation neighbor welding is as follows: each convex polyhedron is collided against all potentially colliding other polyhedrons to produce pairwise collision information in the form of collision manifolds. Then, closer collision information is used to modify further (typically neighbor) collision information in the collision manifolds, recursively. In post-operation neighbor welding, neighbor welding is performed after narrowphase collision detection is performed, and thus after opposing faces are detected, intersections of the polyhedrons are computed, and collision manifolds are generated. On the left in FIG. 15, an example similar to that in FIG. 14 is shown in which a ghost collision may be detected between the first and third body without post-operation neighbor welding. Shown on the right in FIG. 15, the second separating plane is welded, that is the second separating plane is set such that it is parallel to the face of the third body, via post-operation neighbor welding. Because the welded second separating plane and the velocity vector do not intersect, no ghost collision is detected.

While the example provided in FIG. 15 shows how post-operation neighbor welding can prevent ghost collisions from being detected under certain conditions, as illustrated in FIGS. 16-17, post-operation neighbor welding has been found to miss some collisions under certain other conditions, causing unstable performance of the physics engine such as jitter, etc. FIG. 16 (left) shows a three-body example before post-operation neighbor welding in which a ghost collision may be detected between the first and third bodies. This ghost collision is the result of a collision between a fourth face of the first body and the second separating plane. FIG. 16 (right) shows that the ghost collision is avoided after post-operation neighbor welding, which causes the separating plane between the first and third bodies to lie flat in the figure.

FIG. 17 shows an example similar to that of FIG. 16 in which the first body is moving and the second and third bodies are static. Unlike the previous example of FIG. 16, however, the second and third bodies are not parallel to each other. On the left (before post-operation neighbor welding) are three bodies and two separating planes where a ghost collision may be detected between the first and third bodies. On the right (after post-operation neighbor welding) the ghost collision is avoided, however a collision is missed (i.e., not detected) by the solver of the physics engine. This can lead to adverse behavior in the simulation, such as instability of the rigid bodies, which may appear as jitter. It has been realized that the reason that a collision will be missed by the solver under the conditions at right in FIG. 17 is that the opposing faces of the collision manifold for the first and third bodies generated prior to post operation neighbor welding, do not reflect the closest faces of each body after the first body is advanced toward the third body along the velocity vector.

Figure 1:
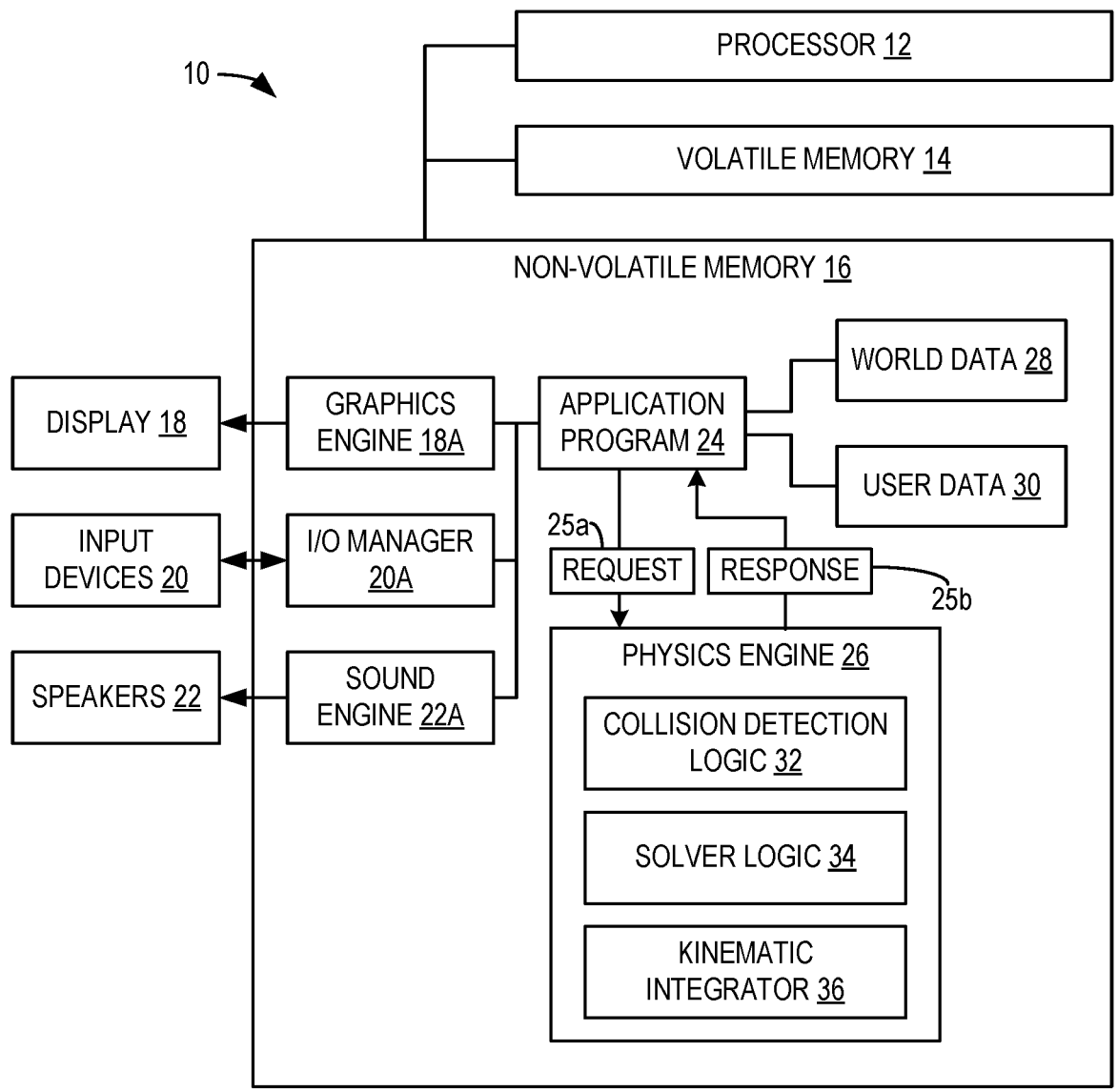
FIG. 1 is a schematic view of a computing device including a processor configured to execute a physics engine to simulate the real-time dynamics of a simulated physical system including a plurality of rigid bodies, according to one embodiment of the present disclosure.

To address the issues of ghost collisions in physics engines, and the attendant disadvantage of missed collisions associated with the above-described approaches to address ghost collisions, systems and methods with improved neighbor welding techniques are provided as illustrated in FIGS. 1-10. FIG. 1 illustrates a computing device 10 configured with a physics engine 26 having collision detection features, according to one embodiment of the present disclosure. Computing device 10 includes a processor 12, volatile memory 14 such as RAM, non-volatile memory 16 such as a hard disk or FLASH memory, a display 18, input devices 20 such as a mouse, keyboard, touchscreen, etc., and one or more speakers 22. The processor 12 is configured to execute various software programs, such as application program 24, which are stored in non-volatile memory 16, using portions of volatile memory 14. Drivers such as a graphics engine 18A, an I/O manager 20A, and sound engine 22A enable communication between application program 24 and the display 18, input devices 20 and speakers 22, respectively. Application program 24 may be a computer game, or virtually any other type of program that utilizes a physics engine 26 that simulates real-time rigid body dynamics in response to user inputs and program logic.

Application program 24 is configured to utilize, and processor 12 is configured to execute, a physics engine 26 to simulate the real-time rigid body dynamics of a simulated physical system including a plurality of rigid bodies. Data representing these physical bodies is stored as world data 28 and user data 30. The application program 24 sends a request 25a to the physics engine 26 for processing, which may include updates to velocities and positions of rigid bodies in the physics simulation based upon user inputs and application program logic, and receives a response 25b with updated positions and velocities of the rigid bodies in the physics simulation.

At a high level, the physics engine 26 includes collision detection logic 32, solver logic 34, and a kinematic integrator 36, which are applied iteratively by the physics engine 26 to adjust the positions and velocities of various bodies in the simulated physical system in order to make them behave appropriately under applied forces, such as gravity, wind resistance, springs, magnetism, etc., as well as observe physical constraints, such as non-penetration of other rigid bodies, joint constraints, etc. Data representing the rigid bodies is delivered from the physics engine to the application program within the response 25b and rendered as graphical output on display 18 by application program 24. Collision detection logic 32, solver logic 34, and kinematic integrator 36 are typically software programs executed by the processor 12, which may be a multi-threaded and possibly multi-core central processing unit (CPU). However, in some embodiments portions or all of the logic of the physics engine 26 described herein may be implemented in firmware or hardware, for example on a graphical processing unit (GPU).

Figure 2:
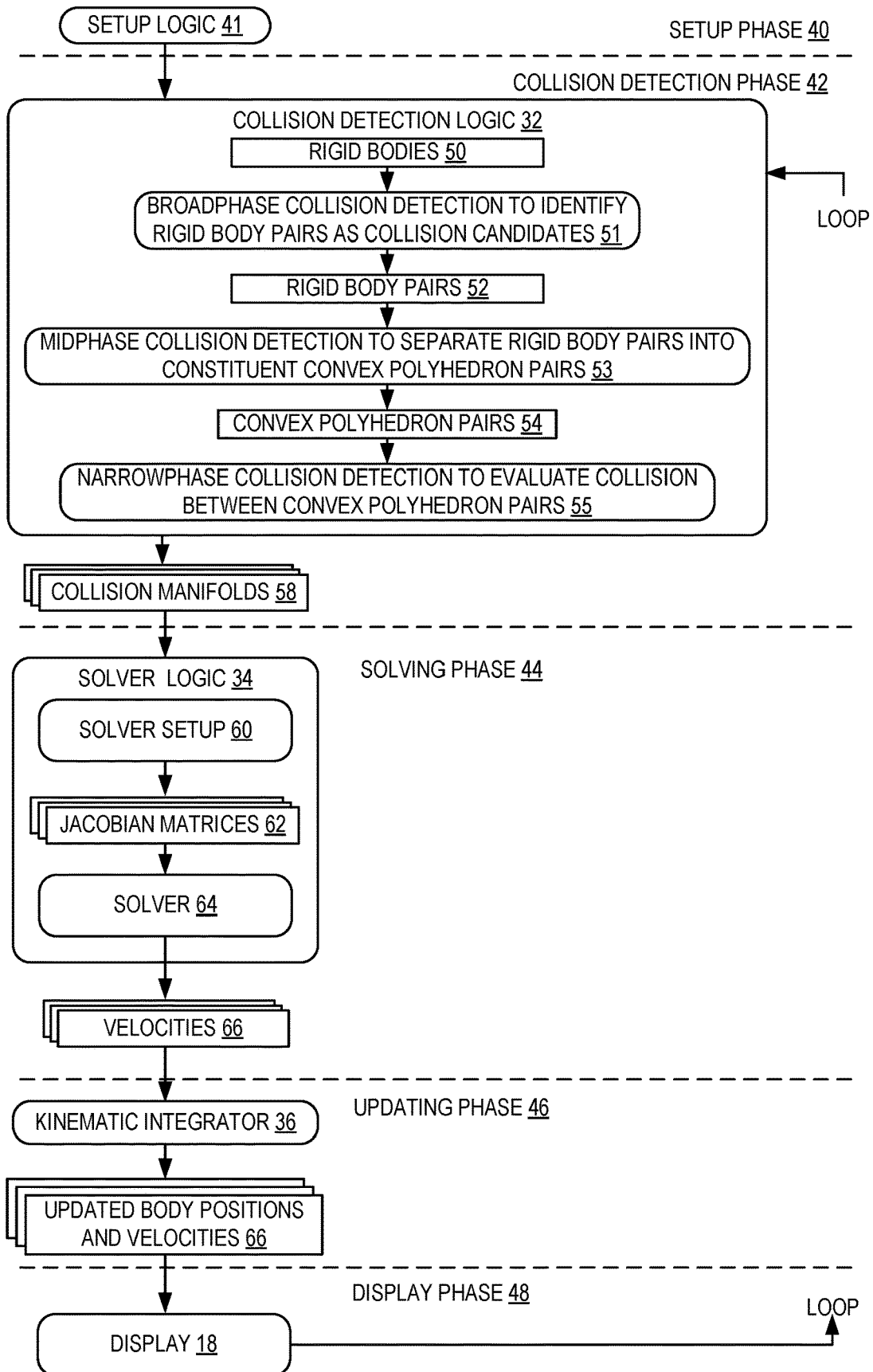
FIG. 2 is a schematic diagram illustrating a looped process flow that may be implemented by the computing device of FIG. 1 during execution of the physics engine, to iteratively compute a series of positions and velocities of rigid bodies in the simulated physical system.

FIG. 2 illustrates an example embodiment of a real-time rigid body simulation by the physics engine 26, which substantially enforces non-penetration of bodies in the system. As shown in FIG. 2, the simulation begins with a setup phase 40 implemented by setup logic 41 executed on processor 12, in which the bodies and their positions, orientations and velocities are initially set prior to kinematic simulation. Following the setup phase 40, the simulation iteratively loops through a collision detection phase 42, a solving phase 44, an updating phase 46, and a display phase 48. During the collision detection phase 42, contact information for a pair of intersecting bodies is generated and output in the form of collision manifolds 58. During the solving phase 44, velocities are computed to be applied to each of the convex polyhedrons 54 of a first rigid body and second rigid body of the pair of intersecting bodies, based on the collision manifolds, to thereby enforce a non-penetration condition. In the updating phase 48, the processor 12 is configured to update body positions and body velocities for a plurality of, and typically all, rigid bodies in the simulation, including the first rigid body and second rigid body of the intersecting pair, based on the computed velocities, and output the updated body positions and body velocities for each rigid body. In the display phase 48, the processor 12 is configured to display graphical representation of the plurality of bodies, including the first rigid body and second rigid body used in the neighbor welding algorithm, at the updated body positions and with the updated body velocities. Once the results are displayed, the process loops back to the collision detection phase 42. Aspects of these phases will now be explained in more detail.

The collision detection phase 42 generates contact points in the form of collision manifolds, for each pair of colliding rigid bodies. Collision detection logic 32 uses as input the positions, orientations, and velocities of the rigid bodies 50 in the physics simulation. In a first phase of broadphase collision detection 51, rigid bodies 50 are evaluated to identify rigid body pairs 52 as collision candidates. During the broadphase collision detection 51, for example, bounding boxes may be placed around the rigid bodies 50, and a broadphase collision detection algorithm may determine any rigid body pairs 52 with colliding bounding boxes. These rigid body pairs 52 are passed as potentially colliding bodies to an algorithm for midphase collision detection 53. In midphase collision detection 53, the rigid body pairs 52 are separated into constituent convex polyhedron pairs 54, wherein each of the convex polyhedrons of the convex polyhedron pair 54 belongs to a separate rigid body 50 of the rigid body pairs 52. During a narrowphase collision detection 55, collisions are evaluated between the convex polyhedron pairs 54. Additional details of the narrowphase collision detection 55 will later be described in greater detail with reference to FIG. 3.

The solving phase 44 implemented by solver logic 34 first generates a set of mathematical constraints (known as Jacobian matrices or simply Jacobians) based on the generated collision manifolds 58. Solver setup 60 includes converting the position and velocity data for the rigid bodies into Jacobian matrices 62, which may be processed in a computationally efficient manner in real time by the solver 64. The constraints are velocity-based, meaning that they are constraints on the velocities of the two contacting bodies. The solver 64 then solves for the body velocities 66 and constraints and finally applies the resulting impulses or forces to the bodies.

In real-time physics engines such as physics engine 26, it may be too computationally expensive to solve an unbounded system of constraints simultaneously. Instead, an iterative algorithm is employed by the solver 64, such as the Projected Gauss Seidel (PGS) algorithm. Rather than solving all constraints at once, PGS iteratively solves each constraint in turn so that the solver 64 converges towards to a stable solution. It will be appreciated that other algorithms may also be used instead of PGS, such as modified versions of the PGS, the Jacobi method, etc.

Bodies may penetrate during rigid-body simulation, due to the imperfect nature of iterative solving and due to accumulated numerical precision errors. When bodies are penetrating, contact points generated between them have a negative distance. To get suitable stability of such an iterative solver, those penetrations are preferably solved in a single simulation frame. If they are solved over many (e.g. >10) simulation frames, the bodies may penetrate visually.

Physics engine 26 may use velocity adjustment or position adjustment to solve penetrations. Adjusting the relative velocity may be achieved by modifying a contact constraint equation by introducing a velocity bias. This bias may be set proportional to the penetration depth, employing a technique known as Baumgarte stabilization. For example, the bias may be set to solve a proportional fraction such as 60% (or other percentage) of the penetration depth every solver step. Adjusting the relative position may alternatively be achieved by running a post-processing algorithm after the solver completes its calculations which repositions the rigid body pair 52 in the simulated physical system. The repositioning may be done iteratively, such that each pair of bodies 52 is solved independently and sequentially.

It will be appreciated that an expanding polytope algorithm may be applied during, for example, the narrowphase collision detection phase when collisions occur and a point on the moving rigid body is determined to penetrate a surface of a paired rigid body. The expanding polytype algorithm provides a determination of a direction and distance to a closest surface along which a velocity may be applied to the penetrating point in order to push the penetrating point out of the rigid body in the current timestep (preferably) or over a predetermined number of timesteps to thereby enforce a non-penetration condition.

Figure 3:
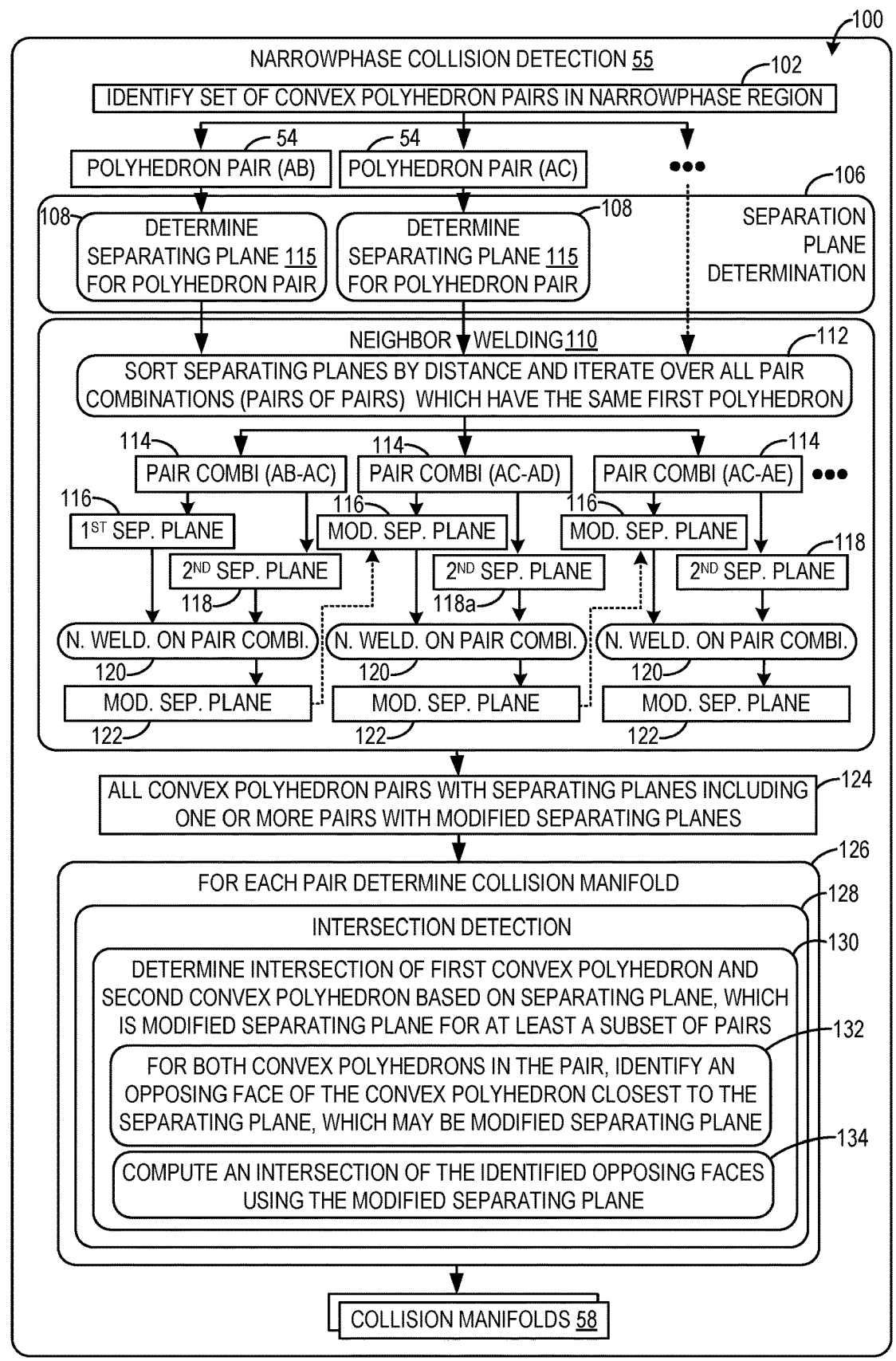
FIG. 3 is a schematic diagram illustrating details of narrowphase collision detection of the collision detection logic of FIG. 2.

FIG. 3 illustrates a detailed view of narrow phase collision detection 55. As shown, the processor 12 executing the physics engine 26 is configured to, in narrow phase collision detection 55 of the collision detection phase 32, perform the following steps of a method 100. At 102, the processor 12 is configured to identify a set of convex polyhedron pairs 54. It will be appreciated that each convex polyhedron pair 54 includes a first convex polyhedron from a first rigid body and a second convex polyhedron from a second rigid body of a rigid body pair of the plurality of rigid bodies of the physics simulation. For example, suppose four convex polyhedrons are present in the narrowphase collision region: A, B, C and D. From these convex polyhedrons, convex polyhedron pairs 54 can be identified, including AB, AC, BC, AD. In practice, predetermined geometric relationships (such as a threshold distance) will define the narrowphase collision region within which the convex polyhedrons are identified.

At 106, the processor 12 is configured to perform a separating plane determination process. In this process, at 108, the processor 12 is configured to, for each convex polyhedron pair 54, determine a separating plane 115. These separating planes 115 will be labeled as first separating planes 116 and second separating planes 118 below, depending on their position in pair combinations 114, and some will be modified to form modified separating planes 122, as discussed below.

The processor 12 is further configured to perform neighbor welding 110 on pair combinations 114 of the convex polyhedron pairs 54 during the narrowphase collision detection 55 to thereby modify the separating planes 115 of at least a subset of the convex polyhedron pairs 54. Within the neighbor welding process 110, the processor 12 is configured to determine an ordered set of pair combinations that share one convex polyhedron, each pair combination including a first polyhedron pair with a first separating plane, and a second polyhedron pair with a second separating plane. Specifically, at 112, the processor 12 is configured to sort the separating planes typically by distance (that is, distance of the polyhedrons along the separating plane normal), to form an ordered set of separating planes. Other sorting criteria are also possible. For example, all pair combinations 114 that share a convex polyhedron (A) may be determined and sorted by the separating normal distance at this step to produce an ordered set. The processor 12 is configured to iterate over the ordered set over all pair combinations that have the same first convex polyhedron, such as example convex polyhedron (A), as described in more detail below.

It will be appreciated that the pair combinations 114 are sets of convex polyhedron pairs 54, that is, pairs 114 of pairs 54. Each pair combination 114 includes a first convex polyhedron pair 54 (e.g., AB) with a first separating plane 116 that has been determined at 108, and a second convex polyhedron pair 54 (e.g., AC) with a second separating plane 118 that also has been determined at 108. Exemplary pair combinations that may be processed in neighbor welding process 110 include AB-AC, AC-AD, AC-AE, etc. It will be appreciated that these pair combinations are merely for illustration and numerous other variations are possible.

The processor 12 is further configured to iterate over each pair combination 114 in the ordered set sequentially, and for at least one pair combination 114 perform neighbor welding 120 on the second separating plane 118 of the pair combination 114, to thereby generate a modified separating plane 122 for the second polyhedron pair of the pair combination 114, which is modified based at least in part on the first separating plane. As the iteration loops through the ordered set sequentially, the modified separating planes from prior iteration steps are carried through to the next iteration step. Thus, as shown at the leftmost dotted line in FIG. 3, the modified separating plane 122 based on the second separating plane 118 for the first pair combination 114 (AB-AC) becomes the separating plane for the second convex polygon pair (AC), and this modified separating plane is used as the separating plane for future neighbor welding 120 involving pair combinations that include the same convex polyhedron (AC). Thus, the modified separating plane 122 from a prior iteration at is used as the first separating plane 116 for a subsequent iteration over a next pair combination 114 involving the same polyhedron pair (e.g., AC). In this way, the neighbor welding effects can continue throughout the iterations. Now, it should be noted that it is not necessary for every pair combination 114 in the ordered set to undergo neighbor welding. For example, one or more geometric or other gateway criteria may be applied, and one or more particular pair combinations may be skipped and not welded with neighbor welding. Typically, however, at least one, and often multiple pair combinations pass the above stated gateway criteria and undergo neighbor welding at 110.

As shown at the dashed lines, second separating planes 118 from prior iteration steps are modified to form modified separating planes 122, and then are used in neighbor welding 120 as first separating planes 116 on subsequent iteration steps. For this reason, first separating planes 116 are labeled "modified separating planes" in FIG. 3 in two example instances. Further, the second separating planes 118 of a pair combination 114 in a subsequent step (e.g., 118a) is based on the prior modified separating planes 122, which have been carried over as the first separating plane 116 of the subsequent step.

At 124, the output of the of the neighbor welding process 110 is a set of all convex polyhedron pairs 54 in the narrowphase collision detection region (i.e., all polyhedrons at 102) with associated separating planes. Within this output, at least one, and typically multiple of the convex polyhedron pairs 54 in the output set have modified separating planes 122 that were modified during the neighbor welding process 110.

At 126, the processor 12 is configured to determine collision manifolds 58 for the convex polyhedron pairs 54, including for the subset of convex polyhedron pairs 54 having the modified separating planes 122. Typically collision manifolds 58 for all intersecting convex polyhedron pairs 54, including both those for which separating planes 115 were modified and those for which the original separating planes 115 determined at 108 are used. Thus, for each convex polyhedron pair 54 that has one of the modified separating planes 122, the processor 12 is configured to, at 128, perform intersection detection. The intersection detection is performed by, at 130, determining an intersection of the first convex polyhedron and the second convex polyhedron based on the modified separating plane 122. This is accomplished by, at 132, identifying an opposing face of the first convex polyhedron closest to the modified separating plane and an opposing face of the second convex polyhedron closest to the modified separating plane, and by, at 134, computing an intersection of the identified opposing face of the first convex polyhedron and the identified opposing face of the second convex polyhedron using the modified separating plane. The processor 12 is further configured to generate a collision manifold based 58 at least in part on the computed intersection for each convex polyhedron pair 54. A similar intersection detection process is performed for those convex polyhedron pairs 54 on which neighbor welding was not performed, with the difference being that for each convex polyhedron pair 54 that does not have one of the modified separating planes 122, determine an intersection of the first convex polyhedron and the second convex polyhedron of the convex polyhedron pair 54 based on an originally determined separating plane 115. Thus, the original separating plane 115 determined at 108 is used rather than a modified separating plane 122 since no neighbor welding was performed on those pairs 54. Once the collision manifold for all pairs 54 in the set output at 124 are generated, they are passed to the solver logic 34 shown in FIG. 2.

Figure 4:
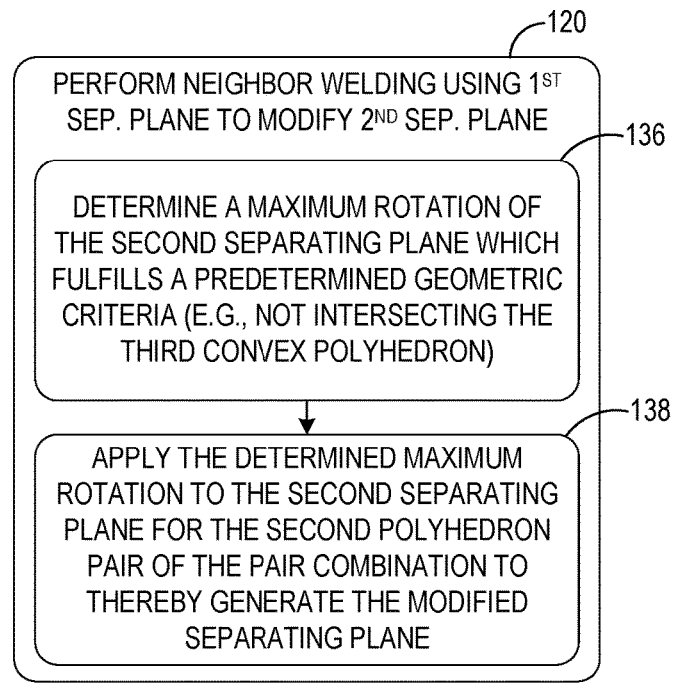
FIG. 4 shows a process flow for a neighbor welding step performed in the narrowphase collision detection of FIG. 3.
Figure 5:
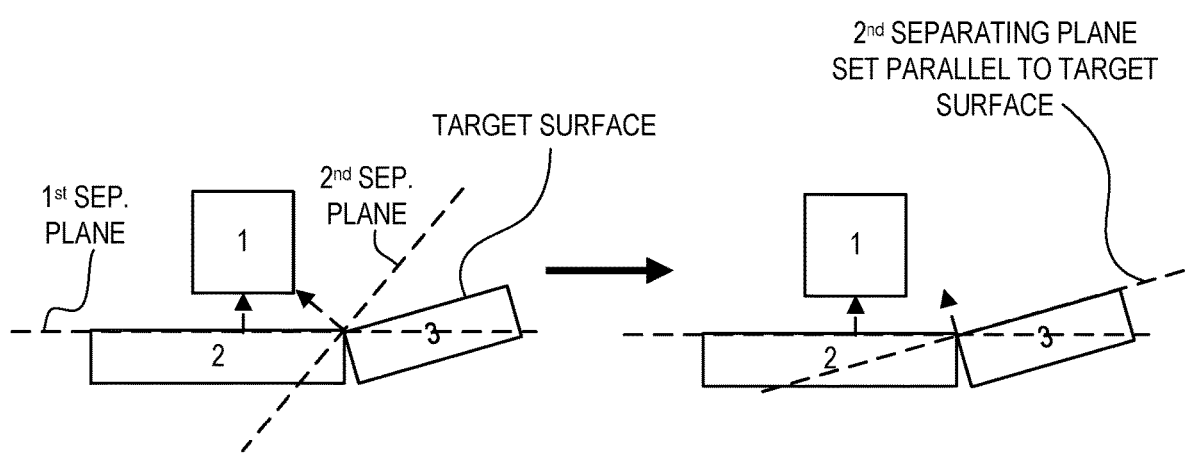
FIG. 5 illustrates the process flow of FIG. 4 applied to example rigid bodies by the physics engine of FIG. 1.

Turning now to FIGS. 4 and 5, detailed description of step 120 of FIG. 3 is provided. As shown in the flowchart depicted in FIG. 4, the physics engine performs neighbor welding at 120 for each pair combination by, at 136, determining a maximum rotation of the second separating plane which fulfills a predetermined criterion, and at 138, apply the determined maximum rotation to the second separating plane for the second polyhedron pair of the pair combination, to thereby generate the modified separating plane. Typically, the predetermined criterion is a predetermined geometric criterion, such as a non-intersection of the second separating plane with the second convex polyhedron of the second polyhedron pair of the pair combination. FIG. 5 illustrates the above-described steps implemented in an example scenario having three bodies represented by convex polyhedrons. In this example, a pair combination including a first pair (1-2) and a second pair (1-3) is illustrated. The first pair (1-2) includes a first (1) and second (2) convex polyhedron, which are separated by the first separating plane. The second pair (1-3) includes the first (1) and third (3) convex polyhedrons, which are separated by the second separating plane. Before neighbor welding (left), the second separating plane passes through a vertex of the third convex polyhedron (which may be an edge in three dimensions) and intersects a plane defined by a target surface of the third convex polyhedron (3). After neighbor welding (right) the second separating plane a maximum rotation has been computed and applied, such that the second separating plane is set parallel to the target surface of the third convex polyhedron (3).

Continuing to FIGS. 6 and 7A-F, a detailed description of one example of step 130 in FIG. 3 is illustrated at 130A, which extends one of the opposing faces prior to computing the intersection. As depicted in FIG. 6, determining an intersection of the first and second convex polyhedrons at 130A includes identifying opposing faces at 132A, similar to step 132 above. Following identification at 132A, at 133A, the processor 12 executing the physics engine 26 is configured to, for each convex polyhedron pair that has one of the modified separating planes, after identifying the opposing faces of the polyhedron pair and before computing the intersection of the polyhedron pair, extend the identified opposing face of the second convex polyhedron in a direction parallel to the modified separating plane and in proportion to a velocity of the first convex polyhedron. At 134A, the processor 12 executing the physics engine 26 is further configured to, for each convex polyhedron pair that has one of the modified separating planes, the processor is configured to compute the intersection of (a) the extended opposing face of the second convex polyhedron and (b) the first convex polyhedron using the modified separating plane.

FIGS. 7A-F illustrate the above-described method for determining collision manifolds implemented in a simulation having three bodies represented by convex polyhedrons. In this simulation is a pair combination 114 including a first pair and a second pair. The first pair includes a first and second convex polyhedrons, which are separated by the first separating plane. The second pair includes the first and third convex polyhedrons, which are separated by the second separating plane. It will be appreciated that the pair combination 114 illustrated in each of FIGS. 7A-7F may be referred to as a first body, second body, and third body, labeled (1)-(3), respectively.

It will be appreciated that while figures showing polyhedrons (e.g. FIGS. 7A-F) are depicted as two dimensional, the methods described are applicable to three-dimensional simulations. As such a description of extending a face of a polyhedron in three dimensions is illustrated in FIG. 10. As shown in FIG. 10, given a projected movement having a movement vector, original points at vertices of a face are duplicated to form duplicated points and moved from their original positions to new positions based on the movement vector. An extended face is then defined that includes the original and duplicated points that form vertices of the extended face. It will be appreciated that this process can involve the computation of Minkowski sums.

Returning to FIG. 7A, this figure illustrates what would happen if the opposing faces between the first and third body were projected onto the welded second separating plane without extension of the face of the third body as described below. In this case, no intersection between the opposing faces would be found, and therefore no collision would be detected. That is, if the extension of step 133A described above were not performed, the collision would be missed. This would be undesirable, and for this reason, the extension of step 133A and computation of 134 are performed, as illustrated in the example scenario shown in FIGS. 7B-7F.

In FIG. 7B, the first convex polyhedron has an initial position and velocity shown as a movement vector. The first separating plane is determined to separate the first face of the first convex polyhedron and the second face of the second convex polyhedron, while the second separating plane separates the third face of the third convex polyhedron and fourth face of the first convex polyhedron. In FIG. 7C, movement of the first convex polyhedron is projected onto the second separating plane, and the projected movement is negated. In FIG. 7D, the negative projected movement is used to extend the opposing face of the third convex polyhedron (third face). In FIG. 7E, the physics engine computes the intersection of the extended opposing face of the third convex polyhedron and the opposing face of the first convex polyhedron (fourth face). FIG. 7F shows an accurately detected collision between the third face and the fourth face. This contrasts with FIG. 17 discussed above, in which a similar collision was missed by post-operation neighbor welding.

Turning now to FIG. 8, an alternative to the above-described implementation of step 130A is provided at 130B, which determines the intersection of the first and second convex polyhedrons using temporary position advancement prior to identifying opposing faces or computing the intersection of the polyhedrons of the pair. As shown in FIG. 8, the processor 12 executing the physics engine 26 is configured to, prior to identifying the opposing faces of the second polyhedron pair at 132B, advance the position of the first convex polyhedron to find a collision area at 131B. Further, after identifying the opposing faces at 132B, which occurs in a similar manner to that described at 132 above although at the advanced position, the processor 12 executing the physics engine 26 is configured to, at 134B, compute the intersection of the opposing face of the first convex polyhedron of the second polyhedron pair at the advanced position and the opposing face of the second convex polyhedron of the second polyhedron pair using the modified second separating plane. At 135B, the processor 12 executing the physics engine 26 is configured to move the computed intersection of the first convex polyhedron by negative advancement.

FIGS. 9A and 9B illustrate the above-described process for determining intersections shown in FIG. 8 at 130B. In FIG. 9A, the first convex polyhedron is at an initial position and is temporarily advanced, that is, virtually moved, along its movement vector, and an impact position is calculated, for example by linear cast. The opposing surfaces for the first and third convex polyhedron are identified as the closest surfaces at the advanced position, rather than at the initial position prior to advancement. An intersection of the two opposing faces identified at the advanced position is computed. The computed intersection is moved to the first convex polyhedron at the initial position by negative advancement. By this technique, when the collision manifold is generated for the second pair of convex polyhedrons (1-3), the opposing faces that are closest to the modified separating plane are sent to the solver. In this way, the collision indicated in FIG. 9B will be solved by the solver. This beneficial result is in contrast to the situation in FIG. 17, in which the collision was missed by the solver after using post-operation neighbor welding.

The above-described systems and methods may be used to simulate collisions of rigid body in a computerized simulation of a physical system, while avoiding the occurrence of ghost collisions, and while also inhibiting missed collisions associated with post-operation neighbor welding techniques. In this way, both the errant physical behaviors that result from ghost collisions, and also the jitter and other negative side effects associated with unstable collision simulation due to missed collisions, can be avoided. As a result, user experience can be improved.

In some embodiments, the methods and processes described herein may be tied to a computing system of one or more computing devices. In particular, such methods and processes may be implemented as a computer-application program or service, an application-programming interface (API), a library, and/or other computer-program product.

Figure 18:
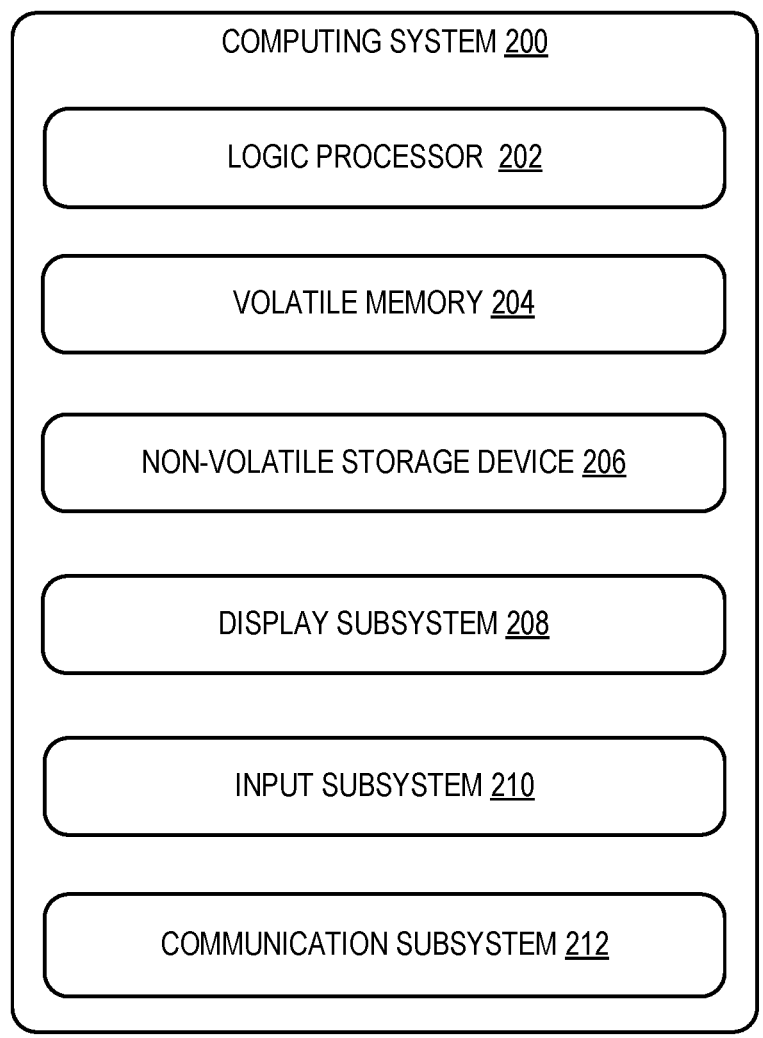
FIG. 18 is an example computing environment that may be used to implement the system of FIG. 1.

FIG. 18 schematically shows a non-limiting embodiment of a computing system 200 that can enact one or more of the methods and processes described above. Computing system 200 is shown in simplified form. Computing system 200 may embody the computer device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 18.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs provide additional support for the claims. According to one aspect, a computing device is provided that comprises a processor configured to execute a physics engine, the physics engine being configured to, during narrowphase collision detection of a collision detection phase identify a set of convex polyhedron pairs, each including a first convex polyhedron from a first rigid body and a second convex polyhedron from a second rigid body, for each convex polyhedron pair, determine a separating plane, perform neighbor welding on pair combinations of the convex polyhedron pairs during the narrowphase collision detection to thereby modify the separating planes of at least a subset of the convex polyhedron pairs, and determine collision manifolds for the convex polyhedron pairs, including for the subset of convex polyhedron pairs having the modified separating planes.

In this aspect, to perform the neighbor welding, the processor may be configured to determine an ordered set of pair combinations that share one convex polyhedron, each pair combination including a first polyhedron pair with a first separating plane, and a second polyhedron pair with a second separating plane.

In this aspect, to perform the neighbor welding, the processor may be further configured to iterate over each pair combination in the ordered set sequentially, and on at least one pair combination perform neighbor welding on the second separating plane of the pair combination, to thereby generate a modified separating plane for the second polyhedron pair of the pair combination which is modified based at least in part on the first separating plane.

In this aspect, to perform the neighbor welding, the processor may be further configured to for each convex polyhedron pair that has one of the modified separating planes, determine an intersection of the first convex polyhedron and the second convex polyhedron based on the modified separating plane by identifying an opposing face of the first convex polyhedron closest to the modified separating plane and an opposing face of the second convex polyhedron closest to the modified separating plane, and computing an intersection of the identified opposing face of the first convex polyhedron and the identified opposing face of the second convex polyhedron using the modified separating plane.

In this aspect, the processor may be configured to perform neighbor welding for each pair combination by determining a maximum rotation of the second separating plane which fulfills a predetermined criterion and apply the determined maximum rotation to the second separating plane for the second polyhedron pair of the pair combination, to thereby generate the modified separating plane.

In this aspect, the processor may be further configured to for each convex polyhedron pair that has one of the modified separating planes, after identifying the opposing faces of the polyhedron pair and before computing the intersection of the polyhedron pair, extend the identified opposing face of the second convex polyhedron in a direction parallel to the modified separating plane and in proportion to a velocity of the first convex polyhedron.

In this aspect, for each convex polyhedron pair that has one of the modified separating planes, the processor may be configured to compute the intersection of (a) the extended opposing face of the second convex polyhedron and (b) the first convex polyhedron using the modified separating plane.

In this aspect, for each convex polyhedron pair that has one of the modified separating planes, prior to identifying the opposing faces of the polyhedron pair, the processor may be configured to advance the position of the first convex polyhedron to find a collision area, and wherein after identifying the opposing faces, the processor may be configured to compute the intersection of the opposing face of the first convex polyhedron at the advanced position and the opposing face of the second convex polyhedron using the modified separating plane, and move the computed intersection of the first convex polyhedron by negative advancement.

In this aspect, the processor may be further configured to iteratively loop through the collision detection phase, a solving phase, and an updating phase, and in the solving phase, compute velocities to be applied to each of the convex polyhedrons of the first rigid body and second rigid body based on the collision manifolds, to thereby enforce a non-penetration condition, and in the updating phase, update body positions and body velocities for a plurality of rigid bodies in a physics simulation performed by the physics engine, including the first rigid body and second rigid body, based on the computed velocities, and output the updated body positions and body velocities.

In this aspect, the processor may be further configured to further iteratively loop through a display phase in which the processor is configured to display graphical representation of each of the first rigid body and second rigid body at the updated body positions and with the updated body velocities.

In another aspect, a method for executing a physics engine on a computing device is provided, the method comprising, during narrowphase collision detection of a collision detection phase, identifying a set of convex polyhedron pairs, each including a first convex polyhedron from a first rigid body and a second convex polyhedron from a second rigid body, for each convex polyhedron pair, determining a separating plane, performing neighbor welding on pair combinations of the convex polyhedron pairs during the narrow-phase collision detection to thereby modify the separating planes of at least a subset of the convex polyhedron pairs, and determining collision manifolds for the convex polyhedron pairs, including for the subset of convex polyhedron pairs having the modified separating planes.

In this aspect, performing the neighbor welding may include determining an ordered set of pair combinations that share one convex polyhedron, each pair combination including a first polyhedron pair with a first separating plane, and a second polyhedron pair with a second separating plane.

In this aspect, performing the neighbor welding, may further include iterating over each pair combination in the ordered set sequentially, and on at least one pair combination perform neighbor welding on the second separating plane of the pair combination, to thereby generate a modified separating plane for the second polyhedron pair of the pair combination which is modified based at least in part on the first separating plane.

In this aspect, performing the neighbor welding may further include for each convex polyhedron pair that has one of the modified separating planes, determining an intersection of the first convex polyhedron and the second convex polyhedron based on the modified separating plane by identifying an opposing face of the first convex polyhedron closest to the modified separating plane and an opposing face of the second convex polyhedron closest to the modified separating plane, and computing an intersection of the identified opposing face of the first convex polyhedron and the identified opposing face of the second convex polyhedron using the modified separating plane.

In this aspect, performing neighbor welding may further include determining a maximum rotation of the second separating plane which fulfills a predetermined criterion, and applying the determined maximum rotation to the second separating plane for the second polyhedron pair of the pair combination, to thereby generate the modified separating plane.

In this aspect, the method may further comprise for each convex polyhedron pair that has one of the modified separating planes, after identifying the opposing faces of the polyhedron pair and before computing the intersection of the polyhedron pair, extending the identified opposing face of the second convex polyhedron in a direction parallel to the modified separating plane and in proportion to a velocity of the first convex polyhedron.

In this aspect, the method may further comprise for each convex polyhedron pair that has one of the modified separating planes, computing the intersection of (a) the extended opposing face of the second convex polyhedron and (b) the first convex polyhedron using the modified separating plane.

In this aspect, for each convex polyhedron pair that has one of the modified separating planes, prior to identifying the opposing faces of the polyhedron pair, the method may further comprise advancing the position of the first convex polyhedron to find a collision area. After identifying the opposing faces the method may further comprise computing the intersection of the opposing face of the first convex polyhedron at the advanced position and the opposing face of the second convex polyhedron using the modified separating plane, and moving the computed intersection of the first convex polyhedron by negative advancement.

In another aspect, a computing device is provided that comprises a processor configured to execute a physics engine, the physics engine being configured to, in a collision detection phase identify a set of convex polyhedron pairs, each including a first convex polyhedron from a first rigid body and a second convex polyhedron from a second rigid body, for each convex polyhedron pair, determine a separating plane determine an ordered set of pair combinations that share one convex polyhedron, each pair combination including a first polyhedron pair with a first separating plane, and a second polyhedron pair with a second separating plane, iterate over each pair combination in the ordered set sequentially, and on each pair combination of a subset of the pair combinations, perform neighbor welding on the second separating plane of the pair combination, to thereby generate a modified separating plane for the second polyhedron pair of the pair combination which is modified based at least in part on the first separating plane. The physics engine is further configured to, for each convex polyhedron pair that has one of the modified separating planes determine an intersection of the first convex polyhedron and the second convex polyhedron based on the modified separating plane by identifying an opposing face of the first convex polyhedron closest to the modified separating plane and an opposing face of the second convex polyhedron closest to the modified separating plane, and computing an intersection of the identified opposing face of the first convex polyhedron and the identified opposing face of the second convex polyhedron using the modified separating plane. The physics engine is further configured to, for each convex polyhedron pair that does not have one of the modified separating planes, determine an intersection of the first convex polyhedron and the second convex polyhedron of the convex polyhedron pair based on an originally determined separating plane, and generate a collision manifold based at least in part on the intersection for each convex polyhedron pair.

In this aspect, the processor may be configured to perform neighbor welding for each pair combination by determining a maximum rotation of the second separating plane which fulfills a predetermined criterion and applying the determined maximum rotation to the second separating plane for the second polyhedron pair of the pair combination, to thereby generate the modified separating plane.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a processor configured to execute a physics engine, the physics engine being configured to, during narrow-phase collision detection of a collision detection phase:
identify a set of convex polyhedron pairs, each convex polyhedron pair including two convex polyhedrons from two respective rigid bodies;
determine an ordered set of pair combinations that share a first convex polyhedron, each pair combination including a first convex polyhedron pair comprising the first convex polyhedron and a second convex polyhedron separated by a first separating plane, and a second convex polyhedron pair comprising the first convex polyhedron and a third convex polyhedron separated by a second separating plane; and perform neighbor welding on the second separating plane of the pair combination, to thereby modify the second separating plane to be set parallel to a target surface of the third convex polyhedron, the modification being based at least in part on the first separating plane.

2. The computing device of claim 1, wherein the processor is configured to:
perform the neighbor welding on pair combinations of the convex polyhedron pairs during the narrowphase collision detection.

3. The computing device of claim 1, wherein the processor is further configured to:
determine collision manifolds for the convex polyhedron pairs, including for the convex polyhedron pairs having a modified second separating plane.

4. The computing device of claim 1, wherein the processor is further configured to:
for each convex polyhedron pair that has a modified second separating plane:
determine an intersection of the first convex polyhedron and the third convex polyhedron based on the modified second separating plane by:
identifying an opposing face of the first convex polyhedron closest to the modified second separating plane and an opposing face of the third convex polyhedron closest to the modified second separating plane; and
computing an intersection of the identified opposing face of the first convex polyhedron and the identified opposing face of the third convex polyhedron using the modified second separating plane.

5. The computing device of claim 4, wherein the processor is configured to perform neighbor welding for each pair combination by:
determining a maximum rotation of the second separating plane which fulfills a predetermined criterion; and
apply the determined maximum rotation to the second separating plane for the second convex polyhedron pair of the pair combination, to thereby generate the modified second separating plane.

6. The computing device of claim 4, wherein the processor is further configured to:
for each convex polyhedron pair that has a modified second separating plane, after identifying the opposing faces of the second convex polyhedron pair and before computing the intersection of the second convex polyhedron pair, extend the identified opposing face of the third convex polyhedron in a direction parallel to the modified second separating plane and in proportion to a velocity of the first convex polyhedron.

7. The computing device of claim 6, wherein for each convex polyhedron pair that has a modified second separating plane, the processor is configured to compute the intersection of (a) the extended opposing face of the third convex polyhedron and (b) the first convex polyhedron using the modified second separating plane.

8. The computing device of claim 4, wherein for each convex polyhedron pair that has a modified second separating plane, prior to identifying the opposing faces of the second convex polyhedron pair, the processor is configured to:

advance the position of the first convex polyhedron to find a collision area, and wherein after identifying the opposing faces, the processor is configured to:
compute the intersection of the opposing face of the first convex polyhedron at the advanced position and the opposing face of the third convex polyhedron using the modified second separating plane; and
move the computed intersection of the first convex polyhedron by negative advancement.

9. The computing device of claim 1, wherein the processor is further configured to:
iteratively loop through the collision detection phase, a solving phase, and an updating phase;
in the solving phase, compute velocities to be applied to each of the convex polyhedrons in the ordered set of pair combinations from the respective rigid bodies based on the collision manifolds, to thereby enforce a non-penetration condition; and
in the updating phase, update body positions and body velocities for a plurality of rigid bodies in a physics simulation performed by the physics engine, including the rigid bodies of the ordered set of pair combinations, based on the computed velocities, and output the updated body positions and body velocities.

10. The computing device of claim 1, wherein the processor is further configured to further iteratively loop through a display phase in which the processor is configured to display graphical representation of each of the rigid bodies at the updated body positions and with the updated body velocities.

11. A method for executing a physics engine on a computing device, the method comprising, during narrowphase collision detection of a collision detection phase:
identifying a set of convex polyhedron pairs, each convex polyhedron pair including two convex polyhedrons from two respective rigid bodies;
determining an ordered set of pair combinations that share a first convex polyhedron, each pair combination including a first convex polyhedron pair comprising the first convex polyhedron and a second convex polyhedron separated by a first separating plane, and a second convex polyhedron pair comprising the first convex polyhedron and a third convex polyhedron separated by a second separating plane; and
performing neighbor welding on the second separating plane of the pair combination, to thereby modify the second separating plane to be set parallel to a target surface of the third convex polyhedron, the modification being based at least in part on the first separating plane.

12. The method of claim 11, further comprising:
performing the neighbor welding on the pair combinations of the convex polyhedron pairs during the narrowphase collision detection.

13. The method of claim 11, further comprising:
determining collision manifolds for the convex polyhedron pairs, including for the convex polyhedron pairs having a modified second separating plane.

14. The method of claim 11, further comprising:
for each convex polyhedron pair that has a modified second separating plane:
determining an intersection of the first convex polyhedron and the third convex polyhedron based on the modified second separating plane by:
identifying an opposing face of the first convex polyhedron closest to the modified second separating plane and an opposing face of the third convex polyhedron closest to the modified second separating plane; and computing an intersection of the identified opposing face of the first convex polyhedron and the identified opposing face of the third convex polyhedron using the modified second separating plane.

15. The method of claim 14, wherein performing neighbor welding further includes:

determining a maximum rotation of the second separating plane which fulfills a predetermined criterion; and applying the determined maximum rotation to the second separating plane for the second convex polyhedron pair of the pair combination, to thereby generate the modified second separating plane.

16. The method of claim 14, further comprising:

for each convex polyhedron pair that has a modified second separating plane, after identifying the opposing faces of the second convex polyhedron pair and before computing the intersection of the second convex polyhedron pair, extending the identified opposing face of the third convex polyhedron in a direction parallel to the modified second separating plane and in proportion to a velocity of the first convex polyhedron.

17. The method of claim 16, further comprising:

for each convex polyhedron pair that has a modified second separating plane, computing the intersection of (a) the extended opposing face of the third convex polyhedron and (b) the first convex polyhedron using the modified second separating plane.

18. The method of claim 14, wherein for each convex polyhedron pair that has a modified second separating plane, prior to identifying the opposing faces of the second convex polyhedron pair, the method further comprises:

advancing the position of the first convex polyhedron to find a collision area, and after identifying the opposing faces the method further comprises:

computing the intersection of the opposing face of the first convex polyhedron at the advanced position and the opposing face of the third convex polyhedron using the modified second separating plane; and moving the computed intersection of the first convex polyhedron by negative advancement.

19. A computing device, comprising:

a processor configured to execute a physics engine, the physics engine being configured to, in a collision detection phase:

identify a set of convex polyhedron pairs, each including a first convex polyhedron from a first rigid body and a second convex polyhedron from a second rigid body;

for each convex polyhedron pair, determine a separating plane;

determine an ordered set of pair combinations that share one convex polyhedron, each pair combination including a first polyhedron pair with a first separating plane, and a second polyhedron pair with a second separating plane;

iterate over each pair combination in the ordered set sequentially, and on each pair combination of a subset of the pair combinations, perform neighbor welding on the second separating plane of the pair combination, to thereby generate a modified separating plane for the second polyhedron pair of the pair combination which is modified based at least in part on the first separating plane;

for each convex polyhedron pair that has one of the modified separating planes:

determine an intersection of the first convex polyhedron and the second convex polyhedron based on the modified separating plane by:

identifying an opposing face of the first convex polyhedron closest to the modified separating plane and an opposing face of the second convex polyhedron closest to the modified separating plane; and computing an intersection of the identified opposing face of the first convex polyhedron and the identified opposing face of the second convex polyhedron using the modified separating plane; and for each convex polyhedron pair that does not have one of the modified separating planes, determine an intersection of the first convex polyhedron and the second convex polyhedron of the convex polyhedron pair based on an originally determined separating plane; and generate a collision manifold based at least in part on the intersection for each convex polyhedron pair.

20. The computing device of claim 19, wherein the processor is configured to perform neighbor welding for each pair combination by:

determining a maximum rotation of the second separating plane which fulfills a predetermined criterion; and applying the determined maximum rotation to the second separating plane for the second polyhedron pair of the pair combination, to thereby generate the modified separating plane.

* * * * *